June 10, 1930. L. EGLINTON 1,763,555
PASSING LIGHT
Filed June 27, 1928

L. Eglinton
INVENTOR

By: Marks & Clerk

Patented June 10, 1930

1,763,555

UNITED STATES PATENT OFFICE

LILLIE EGLINTON, OF FEATHERSTON, WELLINGTON, NEW ZEALAND

PASSING LIGHT

Application filed June 27, 1928. Serial No. 288,775.

This invention relates to a method of and means for illuminating road surfaces at night time to enable drivers of motor vehicles to pass one another in safety and without fear of being dazzled by the lights on the vehicle travelling in the opposite direction.

It has been proposed to effect this purpose by disposing a light on the side of a vehicle approximately midway of its length or near its front, such lamp being directed so as to throw a beam of light over the side of the vehicle and on the ground at that side of the latter along which a vehicle proceeding in an opposite direction must pass, the usual forwardly directed headlights being dimmed or switched off.

While being an undoubted step in the right direction as regards the abolition of the dazzling headlight nuisance, this method of illumination is open to serious objection in that a dark or blind spot is left at the rear of each vehicle. When the driver of a vehicle has passed another vehicle proceeding in the opposite direction his normal tendency is to swing his vehicle onto the centre of the road surface and so into the dark or blind spot before mentioned with the result that accidents have frequently occurred owing to the presence in such dark or blind spot of some unilluminated object such as a pedestrian, cyclist, horse or the like, and the collision with such object before the motorist has had time to switch on his headlights.

The object of this invention is to provide a method of and means for illuminating passing motor vehicles so that the usual headlights can be dimmed or switched off while the road surface and the positions thereon of the passing vehicles are clearly indicated, and the road surface at the rear of each vehicle is clearly illuminated for its entire width.

The invention will be more particularly described and ascertained with reference to the accompanying drawings, wherein:—

Figure 2:
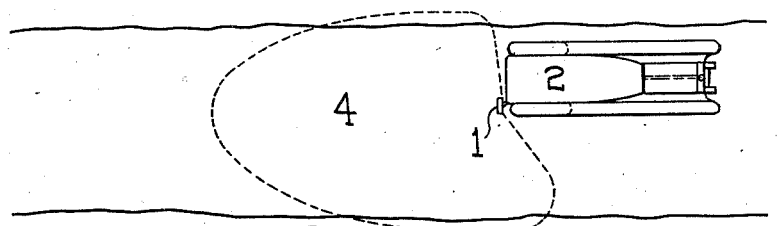
Figure 2 is a plan view of a motor vehicle showing the area of illumination in relation to the road surface on which said vehicle is travelling.
Figure 1:
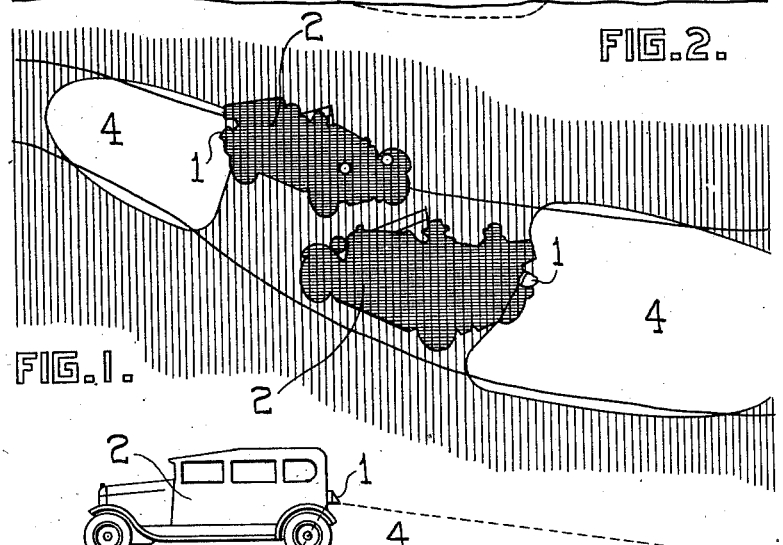
Figure 1 is a perspective view illustrating two motor vehicles passing at night by the aid of the method of illumination provided by this invention.
Figure 3:
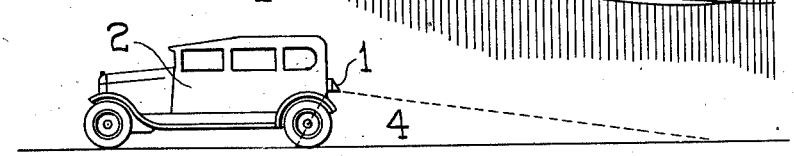
Figure 3 is a side elevation of the vehicle and road illustrated in Figure 2.

According to the invention an electric lamp 1 is mounted or secured to the body of a motor vehicle 2 at that rear corner of the latter which is adjacent to traffic proceeding in the opposite direction the side of the vehicle 2 to which the said lamp 1 is secured, varying of course according to rule of the road as applied in different countries.

This lamp 1 is suitably shaded by means of a reflector 3 so as to throw a bright flood of light 4 completely across the road surface behind the vehicle, and general direction of such light being to the rear of the vehicle and downwards towards the road surface so as not to cause any inconvenience or dazzle to the driver of a following vehicle.

This light is adapted to be brought into use on the usual headlights being dimmed or switched off upon approaching a vehicle travelling in the opposite direction, a suitably arranged electric switch being provided for the purpose within reach of the driver whereby said headlights can be switched off and the rear light simultaneously switched on.

The effect of a bright flood of light 4 thrown onto the ground or road surface at the rear of a vehicle in the hereinbefore described manner is to silhouette the said vehicle clearly and sharply against the bright background thus provided, said light also serving the purpose of showing the driver of the approaching vehicle the exact width of the road and the amount of clearance he has in which to pass the other vehicle.

Further, the vehicles having passed one another, do not run into darkness, but pass into the brightly illuminated areas 4 behind one another, where the drivers can observe any persons, objects or the like which may have been following the vehicle just passed, and where before passing beyond said lighted area the driver has time to again switch on his headlights.

Figure 4:
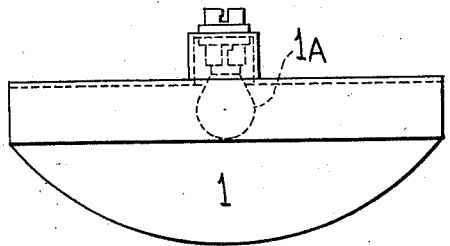
Figure 4 is a plan view of the lamp by means of which the road surface is illuminated.
Figure 6:
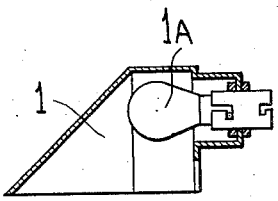
Figures 5 and 6 are sectional elevations of the said lamp.
Figure 5:
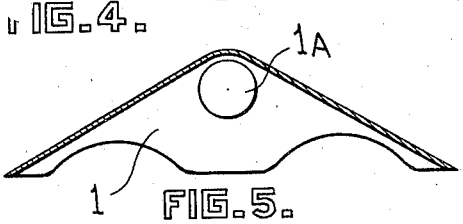

Figures 4, 5 and 6 of the accompanying drawings illustrate a lamp adapted to provide the required illumination. This lamp comprises an electric bulb 1A and reflector 1 having an approximately vertical front side through which the bulb 1A is introduced. The rear side of the reflector 1 is inclined at an approximate angle of 45 degrees and is cowl-shaped to permit the rays of light from the bulb 1A to be projected a considerable distance to the rear of the vehicle but to be so directed or screened that they do not rise to the height of or interfere with the line of vision of the driver of a following vehicle. The said reflector is tapered outwardly to its sides to permit of the projection of rays of light to the full width of a normal road so as to illuminate the latter from side to side. If desired, a compartment can be provided within the lamp 1 adapted to contain a separate electric bulb and a red lens or glass through which the light of said extra bulb is visible from the rear of the vehicle and so provide for the combination with the rear light of the usual red rear light required to be carried by all vehicles.

What I claim as new and desire to secure by Letters Patent is:—

A lamp for connection with the rear part of a vehicle for illuminating both sides of a roadway, comprising a casing in the form of an opened bottom hood having a triangular shaped inner wall provided with recesses in the lower edge thereof, a top wall having the opposite portion arranged in divergent relation and secured to the upper edge of the inner wall, and a semi-circular shaped and bulged outer wall outwardly inclined from the top wall, the inner surfaces of the walls acting as a reflector and a bulb mounted in the inner wall, substantially as and for the purposes set forth.

In testimony whereof I have affixed my signature.

LILLIE EGLINTON.